3,801,552
POLYMERIZATION PROCESS FOR PREPARING
FLUOROELASTOMER
Yutaka Kometani, Toyonaka, Naoya Nakamura, Settsu, Shinichi Nakagawa, Osaka, Yasuyoshi Furukawa, Neyagawa, Masayasu Tomodo, Takatsuki, Masahiko Oka, Settsu, Tsuneo Nakagawa, Kyoto, and Yasuo Miyata, Settsu, Japan, assignors to Daikin Kogyo Co., Ltd., Osaka, Japan
No Drawing. Filed Dec. 30, 1971, Ser. No. 214,424
Claims priority, application Japan, Dec. 30, 1970, 46/126,353; Nov. 30, 1971, 46/96,521
Int. Cl. C08f 1/11, 1/60, 15/40
U.S. Cl. 260—80.77                                     11 Claims

ABSTRACT OF THE DISCLOSURE

A fluoroelastomer having excellent elastomeric property, lower Mooney viscosity and smaller compression set is economically prepared by subjecting tetrafluoroethylene, vinylidene fluoride and hexafluoropropene to the suspension polymerization in an aqueous medium containing at least one of the said monomers and halogenated hydrocarbons which appear as a liquid in the ratio of 10 to 100% by weight to the existing water in the presence of an oil-soluble initiator at 1° to 45° C. under 1 to 30 kg./cm.$^2$ G.

---

The present invention relates to a novel polymerization process for preparing fluoroelastomer, and more particularly to an economical polymerization process for preparing improved fluoroelastomer, that is, tetrafluoroethylene-vinylidene fluoride-hexafluoropropene terpolymer, by means of the suspension polymerization in the presence of an oil-soluble peroxide as an initiator at a low temperature under a low pressure.

A process for preparing a tetrafluoroethylene-vinylidene fluoride-hexafluoropropene terpolymer has been proposed in U.S. Pat. No. 2,968,649 which comprises copolymerizing tetrafluoroethylene, vinylidene fluoride and hexafluoropropene in the presence of ammonium persulfate-sodium bisulfate as a water-soluble redox initiator at a high temperature under a high pressure. The fluoroelastomer obtained by the said known process has disadvantages that with its molecular weight being high enough to give desirable mechanical properties it becomes difficult in processing and also poor in elastomeric property. Because of large modulus at 100% elongation, high hardness and high Mooney viscosity, the fluoroelastomer is subjected with difficulty to a conventional roll molding or extrustion molding, and further scarcely to an injection molding. It is also a problem to stick the elastomer with each other in molding. The fluoroelastomer has a large compression set, which causes problems in case of using as sealing materials such as O-ring and gasket.

According to the emulsion polymerization using water-soluble redox initiators at a high temperature, monomers are dissolved and polymerized in water. The solubility of monomers in water as a polymerization medium is very small, therefore the monomer composition in the polymerization medium is varied during polymerization, and it is difficult to obtain a polymer having uniform composition of monomer unit at an economical polymerization rate. For the above reason, it is necessary to carry out the polymerization under a vigorous agitation or a high pressure. However, the vigorous agitation tends to coagulate the polymer particles in the emulsion, and the high polymerization pressure not only makes the cost of equipment expensive but also has disadvantage in safety operation. Furthermore, since fluoroelastomers are obtained as an emulsion in the known polymerization process, there must be employed a complicated procedure that the polymer is once coagulated from the emulsion by adding acid or salt, and the coagulated polymer is filtered for separation from the medium, washed and dried.

It is an object of the present invention to provide a novel economical polymerization process for preparing improved fluoroelastomer, such as tetrafluoroethylene - vinylidene fluoride-hexafluoropropene terpolymer, without any disadvantages as above-mentioned.

Further object of the invention is to provide a fluoroelastomer having many excellent elastomeric properties as described in detail later.

More further object of the invention is to provide a fluoroelastomer having a lower Mooney viscosity and smaller compression set.

Still further object of the invention is to provide a novel economical suspension polymerization process for preparing fluoroelastomer at low temperature in the presence of oil-soluble initiator.

These and other objects will become apparent in the following description and claims.

It has now been found that the above-mentioned objects can be attained by the suspension polymerization of tetrafluoroethylene, vinylidene fluoride and hexafluoropropene in an aqueous medium containing at least one of the said monomers and halogenated hydrocarbons which appear as a liquid in the ratio of 10 to 100% by weight to water in the presence of an oil-soluble radical initiator at a temperature of 1° to 45° C. under a pressure of 1 to 30 kg./cm.$^2$ G to give terpolymer which composition is in rectangular area formed by the following four ratios of tetrafluoroethylene, vinylidene fluoride and hexafluoropropene being 5:85.7:9.3   5:59.7:35.3,   30:28:42   and 30:54:16, by mole. Thus, fluoroelastomer having especially excellent properties as described hereinafter can be prepared readily and economically by the suspension polymerization of tetrafluoroethylene, vinylidene fluoride and hexafluoropropene under the said specific conditions.

The fluoroelastomer of the present invention has further excellent resistances to heat and chemicals in comparison with those of the said known fluoroelastomer. Mooney viscosity of the fluoroelastomer in the present invention is lower than that prepared by the known process and the flow property of curable composition is thus improved. The improvement shows that its processing becomes easy even to fabricate fairly complicated articles. Besides, the fluoroelastomer has excellent elastomeric properties, for instance, a small modulus at 100% elongation low hardness and the like. The compression set of the fluoroelastomer in the present invention is lowered in comparison with that of the said known process.

According to the present invention, the obtained fluoroelastomer has good flow property and excellent releasing property from molds. Thus, molds are kept clean even when molding is repeated many times.

In the polymerization process of the present invention, monomers and/or halogenated hydrocarbons appear as liquid droplets suspended in an aqueous medium and the copolymerization takes place in the said droplets thus to form a fluoroelastomer of fine granules. Therefore, the fluoroelastomer of uniform composition and of high molecular weight can be readily prepared at an economical polymerization rate without a vigorous agitation or a high pressure. These can not be achieved by the said known process. The recovering procedure of the fluoroelastomer prepared can be readily proceeded bacause it is obtained as granules, and it is enough to separate the granules of the fluoroelastomer, wash with water and dry.

It is one of the most important facts in the present invention that the fluoroelastomer is prepared by means of the suspension polymerization which has not been known in any literature with respect to polymerization of the fluoroelastomer. For instance, the processes of the said patents concern only an emulsion polymerization using water-soluble initiator. It has been commonly accepted to prepare the fluoroelastomer by emulsion polymerization but not by the suspension polymerization, because it is difficult to disperse polymer particles in an aqueous medium during polymerization due to the stickiness of granules of the fluoroelastomer. The present invention makes it possible for the first time to perform the suspension polymerization in the presence of the organic liquid under the said specific conditions. In the present invention, it is remarked that the fluoroelastomer having many excellent properties as above-mentioned can be prepared economically by means of the suspension polymerization under the said specific conditions.

The polymerization temperature in the present invention is preferably 1° to 45° C., particularly 10° to 40° C. In case of above 45° C. some of the said excellent properties of the fluoroelastomer may be lost. In case of below 1° C. the fluoroelastomer may not be obtained at an economical polymerization rate and further troubles on chemical engineering may occur.

The fluoroelastomer obtained by the process of the present invention has one prominent characteristic in view point of low Mooney viscosity which is a measure for an easier processing. Comparing fluoroelastomers of same intrinsic viscosity (measured at 35° C. by using methyl ethyl ketone as a solvent; hereinafter referred to as $[\eta]$) of about 0.9 to 1.0, a fluoroelastomer obtained according to the known process by using ammonium persulfate-sodium bisulfite as a polymerization initiator at a higher temperature of 100° C. has a minimum viscosity at 121° C. by Mooney Scorch test (measured by the provision of JIS K 6300; hereinafteer referred to as "minimum viscosity") of 70 to 80. On the contrary, a fluoroelastomer having the same $[\eta]$ as above, which is obtained according to the process of the present invention by using di(3,5,6-trichloro - 2,2,3,4,4,5,6,6 - octafluorohexanoyl) peroxide as a polymerization initiator at a temperature of 30° C. has a minimum viscosity of 30 to 50 which is extremely small.

The minimum viscosity at 121° C. varies according to $[\eta]$. The minimum viscosity of the fluoroelastomer prepared by the known emulsion polymerization is 90 at $[\eta]$ of 1.2 and 50 at 0.65, and contrarily that of the fluoroelastomer prepared by the process of the present invention using di(3,5,6 - trichloro - 2,2,3,4,4,5,6,6 - octafluorohexanoyl) peroxide as a polymerization initiator is 45 at $[\eta]$ of 1.2 and 25 at 0.65. It is clearly shown that the elastomer in the present invention can be more readily molded.

Also, flow property of the fluoroelastomer in the present invention is improved in comparison with that of the fluoroelastomer obtained by the known emulsion polymerization. Flow property of the fluoroelastomer was measured by using a flow tester made by Shimadzu Seisakusho Co., Ltd. using a die of 1 mm. in diameter, at a temperature of 140° C., about the fluoroelastomer of tetrafluoroethylene:vinylidene fluoride:hexafluoropropene being the molar ratio of about 12:68:20. Taking the same intrinsic viscosity of the fluoroelastomer ($[\eta]$: about 1.1), the flow rate of the fluoroelastomer in the present invention is $4 \times 10^{-3}$ cm.$^3$/sec. and that in the known process is only $2.5 \times 10^{-4}$ cm.$^3$/sec. With respect to the fluoroelastomer of the molar ratio of tetrafluoroethylene:vinylidene fluoride:hexafluoropropene being about 18:57:25, the same difference is observed. Such a fact shows that the fluoroelastomer obtained by the present invention is extremely superior in flow property compared with the known fluoroelastomer.

A cured article obtained from the fluoroelastomer in the present invention shows a small modulus at 100% elongation of about 20 to 40 kg./cm.$^2$, but that from a commercial one shows a large modulus at 100% elongation of 50 to 70 kg./cm.$^2$.

The cured article in the invention shows low hardness of about 68 to 75, but that of the commercial one shows high hardness of about 75 to 78. These results indicate that the cured article prepared from the fluoroelastomer in the present invention is more elastomeric.

The cured article obtained from the fluoroelastomer in the present invention shows a small compression set, for instance, that from a fluoroelastomer prepared using diisopropyl peroxydicarbonate as an initiator at 40° C. shows a small compression set of about 25%. It is clearly seen from the above result that the compression set of the cured article by the present invention is extremely improved.

The fluoroelastomer in the invention gives a favorable thermal stability. The fluoroelastomer obtained by the known emulsion polymerization is unfavorably discolored or blackened during drying in a steam drier and, contrarily, no discoloration is observed during drying for the fluoroelastomer in the invention.

Glass transition temperature of the fluoroelastomer in the invention measured by Gehman torsion test is found as low as about $-20°$ to $-30°$ C.

In the process of the present invention, the ratio of tetrafluoroethylene, vinylidene fluoride and hexafluoropropene used as monomers for polymerization which can be provided as a characteristic fluoroelastomer at a polymerization temperature of 1° to 45° C. is in the rectangular area formed by the following four ratios of tetrafluoroethylene:vinylidene fluoride:hexafluoropropene being 5:85.7:9.3, 5:59.7:35.3, 30:28:42 and 30:54:16, and more preferably 10:79.3:10.7, 10:53.3:36.7, 25:34.3:40.7 and 25:60.3:14.7, by molar ratio. Higher molar ratio of tetrafluoroethylene than the above-mentioned range brings high Mooney viscosity, large modulus at 100% elongation, large compression set and large loss of tensile strength after heat aging. Lower molar ratio of tetrafluoroethylene than the above-mentioned brings poor heat resistance, for instance, large loss of elongation and hardens cured article after heat aging. In case of the molar ratio of hexafluoropropene being higher than the above-mentioned range, the polymerization rate is extemely decreased and it is difficult to obtain the molded article of having good mechanical properties and compression set. Further, the tensile strength after heat aging becomes small. Lower molar ratio of hexafluoropropene than the above-mentioned brings poor elastomeric properties.

In carrying out the process of the present invention, a fluoroelastomer of the molar ratio of tetrafluoroethylene:vinylidene fluoride:hexafluoropropene being 12:63:25 is obtained as follows. A polymerization vessel is charged with one liter of water, 300 cc. of 1,1,2-trichloro-1,2,2-trifluoroethane, and monomer mixture of tetrafluoroethylene:vinylidene fluoride:hexafluoropropene in the molar ratio of 4:38:58. It is stirred at 30° C. and added with an initiator. A monomer mixture which composition corresponds to that of a formed terpolymer (tetrafluoroethylene:vinylidene fluoride:hexafluoropropene is about 12:63:25, by molar ratio) is added so as to maintain a constant pressure, thus to obtain the desired fluoroelastomer of a uniform composition. Analysis of the resultant fluoroelastomer prepared by the above procedure has a monomer composition of tetrafluoroethylene:vinylidene fluoride:hexafluoropropene being 15.2:63.4:21.4, by molar ratio.

In the process of the present invention, copolymerization may further be carried out with other copolymerizable monomer in the molar ratio of 0.01 to 10%, preferably 0.5 to 5%. Suitable examples of the copolymerizable monomer are acrylic acid, methacrylic acid and their esters, ethylene, acetylene and their halogenated compounds, vinyl compounds and their derivatives, dienes, ring-opening polymerizable monomers, and the like.

According to the present invention, polymerization is preferably carried out by suspension polymerization in an aqueous medium containing liquid monomers and/or liquid halogenated hydrocarbons at a temperature from 1° to 45° C. in view points of economy, safety operation, easy handling and preventing of adhesiveness to polymerization vessel. The ratio of the liquid monomers and/or halogenated hydrocarbons to water appear in the ratio of 10 to 100%, preferably 20 to 67% by weight. In case of the ratio of the liquid monomer or halogenated hydrocarbon being higher than the above, the obtained fluoroelastomer becomes difficult on handling due to increased adhesion to the wall of polymerization vessel, and in case that being lower, the same inconveniences tend to occur. As a halogenated hydrocarbon, chlorofluoroalkanes are suitably used such as 1,1,2-trichloro-1,2,2-trifluoroethane, 1,2 - dichloro - 1,1,2,2-tetrafluoroethane, trichlorofluoromethane, dichlorodifluoromethane, and the like, especially, 1,1,2-trichloro-1,2,2-trifluoroethane.

As the liquid monomers and/or halogenated hydrocarbons are dispersed in water, the monomers appear as liquid droplets or are dissolved into the droplets of halogenated hydrocarbons, and copolymerization takes place in the droplets to produce polymer granules, as described before and a fluoroelastomer of a narrow distribution in composition can be readily obtained at an economical polymerization rate without a vigorous agitation and a high pressure. Further, a fluoroelastomer is obtained as granules which enables its handling easy because of lessening the adhesion to the wall of the vessel as a result of coactive effect by the use of suspension stabilizer described hereinafter.

An amount of water is suitably in the range of about 50 to 1000%, preferably 100 to 500% to the obtained fluoroelastomer.

As an initiator, there may be used one which causes polymerization at 1° to 45° C. The oil-soluble polymerization initiators are suitably used such as di[perfluoro(or fluorochloro)acyl] peroxide, dialkyl peroxydicarbonate, diacyl peroxide, peroxyester, and acetylcyclohexylsulfonyl peroxide. Examples of the di[perfluoro (or fluorochloro) acyl] peroxide having the general formula: [RCO]$_2$O$_2$ wherein R is a perfluoroalkyl group containing 2 to 24 carbon atoms, are di(omega-hydro-dodecafluoroheptanoyl) peroxide,
di(omerga-hydro-tetradecafluorooctanoyl) peroxide,
di(omega-hydro-hexadecafluorononanoyl) peroxide,
di(perfluorobutyryl) peroxide,
di(perfluorovaleryl) peroxide,
di(perfluorohexanoyl) peroxide,
di(perfluoroheptanoyl) peroxide,
di(perfluorooctanoyl) peroxide,
di(perfluorononanoyl) peroxide,
di(omega-chlorohexafluorobutyryl) peroxide,
di(omega-chloro-decafluorohexanoyl) peroxide,
di(omega-chloro-tetradecafluorooctanoyl) peroxide,
omega-hydro-dodecafluoroheptanoyl-omega-hydro-hexadecafluorononanoyl peroxide,
omega-chlorohexafluorobutyryl-omega-chloro-decafluorohexanoyl peroxide,
omega-hydro-dodecafluoroheptanoyl-perfluorobutyryl peroxide,
di(dichloropentafluorobutanoyl) peroxide,
di(trichlorooctafluorohexanoyl) peroxide,
di(tetrachloroundecafluorooctanoyl) peroxide,
di(pentachlorotetradecafluorodecanoyl) peroxide,
and the like.

Especially, di(3,5,6 - trichloro-2,2,3,4,4,5,6,6-octafluorohexanoyl) peroxide provides the most favorable result. Examples of the dialkyl peroxy-dicarbonate having the general formula: [ROCO]$_2$O$_2$ wherein R is an alkyl group containing 1 to 10 carbon atoms, are diisopropyl peroxydicarbonate,
di-s-butyl peroxydicarbonate,
di-s-amyl peroxydicarbonate,
di-s-hexyl peroxydicarbonate,
di-n-propyl peroxydicarbonate,
di-n-butyl peroxydicarbonate,
and the like.

Especially, diisopropyl peroxydicarbonate provides the most favorable result. Examples of the others are isobutyryl peroxide, di-t-butyl peroxyoxalate, and the like.

It has been assumed that the said di[perfluoro (or fluorochloro)acyl] peroxides are to be used only for the polymerization in organic solvent because the hydrolysis of an initiator in contact with water decreases the efficiency of an initiator. However, it has been found that the polymerization reaction using the said di[perfluoro (or fluorochloro)acyl] peroxides is effectively employed in the specific condition of the present invention even in the aqueous system.

The polymerization can be carried out under a pressure of about 1 to 30 kg./cm.$^2$, and the pressure employed is relatively lower, about 1 to 15 kg./cm.$^2$ by using halogenated hydrocarbon. Suspensiaon stabilizer such as methylcellulose and polyvinyl alcohol may be employed in the present invention in an amount of 0.005 to 0.5% by weight to water, and magnesium oxide, calcium oxide, borax, and the like may be also added. Buffers such as phosphoric acid-phosphate and boric acid-borate may be used, if necessary. Modifiers, such as isopentane, carbon tetrachloride and trichlorofluoromethane may be also used.

The fluoroelastomer prepared by the process of the present invention can be cured by using the same curing agent as that used in the curing of ordinary fluoroelastomers. Examples of the curing agent are such as peroxides, polyamines and their derivatives, spiroacetal compounds, a combination of hexamethylenediamine and quaternary amines, alkyl pyridines or quinolines, a combination of polyether compounds and nucleophilic reagents (or polyamines). If necessary, curing may be carried out in the presence of dioximes or acid anhydrides, and further in the presence of acid acceptors, such as magnesium oxide, lead oxide, calcium oxide and zinc oxide-dibasic phosphate. Fillers, such as carbon black, white carbon, talc, calcium carbonate and clay may be added. Plasticizers or colorants may be added therein. As a method for adding the said additives, such as curing agent, acid acceptor and filler, the same method as in a conventional fluoroelastomer is applied, for instance, such as milling by a pair of mixing rolls. Compounds thus obtained are cured in a mold at 100° to 200° C., preferably 130° to 170° C. for 10 to 60 minutes under a pressure, and then cured in a oven at 150° to 300° C., especially 200° to 250° C. for 10 to 40 hours, especially about 24 hours to give cured elastomers.

The minimum viscosity mentioned above is determined by the following Mooney Scorch test. A compound below is milled by a pair of mixing rolls, cooled with water and it is tested by using a Mooney viscometer with S-type rotor at 121° C. according to the provision of JIS K 6300.

| Composition: | Parts by weight |
|---|---|
| Fluoroelastomer | 100 |
| Magnesium oxide | 15 |
| Medium thermal carbon | 20 |
| Hexamethylenediaminecarbamate | 1.5 |

Modulus at 100% elongation is determined by the following procedures: An above compound is milled by mixing rolls, cured at 150° C. for 30 minutes under a pressure of 50 kg./cm.$^2$ and then cured at 200° C. for 24 hours, thus, to obtain a cured sheet. Dumbell test pieces with a thickness of 2 mm. are prepared from the cured sheet and tested by a universal testing machine at a rate of 50 cm./min. according to the provision of JIS K 6301. Tensile strength and elongation are measured together with the method of determination of modulus.

Hardness is measured by using a spring type tester according to the provision of JIS K 6301.

Compression set is measured with the test disk sample with a thickness of 12.7 mm. and a diameter of 29 mm. which is cured similarly to that of the modulus. The test sample is kept at 200° C. under a compression of 25% for 24 hours, and then allowed to stand at a room temperature for 30 minutes for measurement with a thickness gauge according to the provision of JIS K 6301.

Gehman torsion test is measured in a range of −50° to 0° C. according to the provision of ASTM D–1053–58T, in which the sample tested is prepared by milling with mixing rolls and molded at 120° C.

The present invention is more particularly described and explained by means of the following illustrative examples, in which all "parts" and "percent" are by weight except as noted.

EXAMPLES 1–6

A three liter polymerization autoclave, made from stainless steel, provided with a magnetic stirrer was charged with one liter deoxidized water and 0.3 g. of methylcellulose (50 cps.). After the autoclave was thoroughly replaced with pure nitrogen gas and then evacuated, the autoclave was charged with 300 cc. of 1,1,2-trichloro-1,2,2-trifluoroethane, then with 300 g. of a monomer mixture consisting of tetrafluoroethylene, vinylidene fluoride and hexafluoropropene in the molar ratio of 4.5:44.9:50.6, and kept at 40° C. with agitation.

A 125 cc. tank cooled by dry ice was charged with 50 cc. of 1.97% solution of di(3,5,6-trichloro-2,2,3,4,4,5,6,6-octafluorohexanoyl) peroxide in 1,1,2-trichloro-1,2,2-trifluoroethane, and the initiator solution was introduced into the autoclave to initiate the polymerization.

Another 20 liter autoclave was charged with monomer mixture consisting of tetrafluoroethylene, vinylidene fluoride and hexafluoropropene in the molar ratio of 12:68:20 and connected to the said autoclave. The monomer mixture was supplied to the polymerization autoclave so as to maintain a constant pressure between 9 to 10 kg./cm.$^2$ G. Further, 50 cc. of the said initiator solution were additionally supplied, and polymerization for about 5 hours gave about 300 g. of a fluoroelastomer as small white granules. The molar ratio of tetrafluoroethylene:vinylidene fluoride:hexafluoropropene was 14.0:69.8:16.2.

The same procedures were repeated but with various ratios of monomer. Each fluoroelastomer 100 parts thus obtained was added 15 parts of magnesium oxide, 20 parts of medium thermal carbon and 1.5 parts of hexamethylenediaminecarbamate. Above compounds were milled by rolls, press-cured under a pressure of 50 kg./cm.$^2$ at 150° C. for 30 minutes and oven-cured at 200° C. for 24 hours.

The results of measurement for physical properties of the cured articles obtained are shown in Table 1.

TABLE 1

| Example number | Ratio of monomer in initial charging TFE : VdF : HFP (by molar ratio) | Ratio of monomer in continuous charging TFE : VdF : HFP (by molar ratio) | Polymerization temperature, °C. | Yield of polymer, g. | Intrinsic viscosity | Minimum viscosity | Mooney scorch $t_3$, min. | $t_{10}$, min. | $t_{18}$, min. | $t_{A15}$, min. | Properties of cured article Modulus at 100%, kg./cm.$^2$ | Tensile strength, kg./cm.$^2$ | Elongation (percent) | Hardness | Properties after air-aging Tensile strength, kg./cm.$^2$ | Elongation (percent) | Hardness |
|---|---|---|---|---|---|---|---|---|---|---|---|---|---|---|---|---|---|
| 1 | 5.5 : 30.5 : 64 | 18 : 52 : 30 | 30 | 271 | 0.91 | 47 | 13.0 | 18.5 | 25.0 | 12.0 | 27 | 137 | 310 | 72 | 38 | 340 | 77 |
| 2 | 4.4 : 31.9 : 64 | 12 : 58 : 30 | 30 | 202 | 0.48 | 21 | 14.5 | 21.5 | 27.5 | 13.0 | 25 | 88 | 380 | 74 | 27 | 300 | 82 |
| 3 | 8.4 : 33.9 : 57.7 | 22 : 53 : 25 | 30 | 160 | 1.39 | 56 | 13.5 | 18.5 | 23.0 | 9.5 | 44 | 165 | 290 | 76 | 68 | 290 | 81 |
| 4 | 5.8 : 36.5 : 57.7 | 18 : 57 : 25 | 30 | 311 | 1.05 | 41 | 11.0 | 15.2 | 18.7 | 7.7 | 38 | 136 | 270 | 72 | 52 | 260 | 79 |
| 5 | 4.3 : 38 : 57.7 | 12 : 63 : 25 | 30 | 296 | 1.07 | 48 | 12.5 | 17.2 | 22.0 | 7.0 | 29 | 149 | 270 | 72 | 57 | 260 | 83 |
| 6 | 4.5 : 44.9 : 50.6 | 12 : 68 : 20 | 30 | 287 | 1.00 | 38 | 11.5 | 15.2 | 18.5 | 9.0 | 28 | 151 | 250 | 71 | 87 | 140 | 86 |
| Comparative example | 6 : 34.5 : 59.5 | 12 : 68 : 20 | 100 | 203 | 1.22 | 99 | 6.0 | 7.5 | 8.2 | 2.2 | 58 | 152 | 170 | 78 | 112 | 85 | 95 |

Note.—TFE=Tetrafluoroethylene; VdF=Vinylidene fluoride; HFP=Hexafluoropropene.

As made clear from Table 1, the minimum viscosity of the fluoroelastomers obtained by the present examples was extremely low in comparison with the terpolymers in the same [η] obtained by emulsion polymerization at high temperature as Comparative Example (using ammonium persulfate as an initiator in the absence of 1,1,2-trichloro-1,2,2-trifluoroethane at a polymerization temperature of 100° C.). And the obtained fluoroelastomers of the invention showed excellent elastomeric properties with lower modulus at 100% elongation and lower hardness in comparison with the elastomer by the emulsion polymerization at high temperature as Comparative Example. The cured articles were air-aged at 315° C. for 16 hours and measured about physical properties at a room temperature.

EXAMPLE 7

The procedure in Example 1 was repeated except that the polymerization vessel was charged with 490 g. of hexafluoropropene instead of 1,1,2-trichloro-1,2,2-trifluoroethane and then with a monomer mixture of 171 g. of hexafluoropropene, 231 g. of vinylidene fluoride and 53 g. of tetrafluoroethylene. The polymerization was carried out at 30° C. under 20 kg./cm.$^2$ G. A monomer mixture consisted of hexafluoropropene:vinylidene fluoride:tetrafluoroethylene being in a molar ratio of 18:62:20 was supplied to the autoclave so as to maintain a constant pressure. After 70 minutes, 350 g. of terpolymer were obtained. In that case, it was observed that some polymer stuck on the wall of polymerization vessel.

EXAMPLE 8

The procedure in Example 6 was repeated except that 2 g. of diisopropyl peroxydicarbonate were used instead of di(3,5,6-trichloro-2,2,3,4,4,5,6,6 - octafluorohexanoyl) peroxide as a polymerization initiator at 40° C. under 11.5 kg./cm.$^2$ G. As a result, 96 g. of terpolymer were obtained for 210 minutes.

EXAMPLE 9

The procedure in Example 6 was repeated except that 1.0 g. of acetylcyclohexyl sulfonyl peroxide was used as a polymerization initiator at 40° C. under 11 kg./cm.$^2$ G. As a result, 65 g. of terpolymer were obtained for 203 minutes.

EXAMPLE 10

The procedure in Example 6 was repeated except that 1.28 g. of diisobutyryl peroxide were used as a polymerization initiator at 35° C. under 11 kg./cm.$^2$ G. As a result, 10 g. of terpolymer having a relatively low molecular weight were obtained for 145 minutes.

EXAMPLE 11

The procedure in Example 6 was repeated except that 4 g. of di(t-butylcyclohexyl) peroxydicarbonate were used as a polymerization initiator at 40° C. under 11 kg./cm.$^2$ G. As a result, 26 g. of terpolymer were obtained for about 170 minutes.

EXAMPLE 12

The procedure in Example 6 was repeated except that polyvinyl alcohol was used instead of methylcellulose as a suspension stabilizer at 30° C. under 10 kg./cm.$^2$ G. The suspension polymerization was effectively carried out without any adhesion of polymer to the wall.

EXAMPLE 13

In the same polymerization as in Example 1 (the molar ratio of tetrafluoroethylene:vinylidene fluoride:hexafluoropropene was 17.5:68.1:14.4) the controlling of molecular weight was examined but without any additional charge of initiator. The autoclave was added with 0, 30, 70, 100 and 300 cc., respectively, of trichlorofluoromethane as a chain transfer agent where in case of 300 cc. no 1,1,2-trichloro-1,2,2-trifluoroethane was added. As a result of the polymerization, [η] of the terpolymer was 1.82, 1.55, 0.94, 0.65 and 0.35, respectively.

In case of using 2 g. of isopentane as a chain transfer agent, [η] was 0.52.

In case of 3.2 g. (0.32% to existing water) of carbon tetrachloride, [η] was 0.57, and in case of 0.8 g. [η] was 1.17.

EXAMPLE 14

The procedure in Example 6 was repeated except that polymerization temperature of 20° C. and 40° C. were used, respectively. In each case, an excellent elastomer was obtained.

EXAMPLES 15–16

A 30 liter stainless steel autoclave provided with a stirrer was charged with 15 liters of deoxidized water and 4.5 g. of methylcellulose (50 cps.). The autoclave was thoroughly replaced with pure nitrogen gas, and added with 4.5 liters of 1,1,2-trichloro-1,2,2-trifluoroethane. Then, the said autoclave was further charged with 4.5 kg. of a monomer mixture consisted of tetrafluoroethylene, vinylidene fluoride and hexafluoropropene in a molar ratio of 5.8:36.5:57.7 and maintained at 30° C. with agitation.

On the other hand, a tank was charged with 15.2 g. of di(3,5,6-trichloro-2,2,3,4,4,5,6,6-octafluorohexanoyl) peroxide in 100 cc. of of 1,1,2-trichloro-1,2,2-trifluoroethane. The solution was introduced into the autoclave.

Another 10 liter stainless steel autoclave for monomer was charged with a monomer mixture consisted of tetrafluoroethylene, vinylidene fluoride and hexafluoropropene in a molar ratio of 18:57:25. The monomer mixture was charged into the said autoclave for polymerization in order to maintain a constant pressure between 11.5 and 12.5 kg./cm.$^2$ G. Furthermore, a solution of 7.6 g. of the said polymerization initiator in 100 cc. of 1,1,2-trichloro-1,2,2-trifluoroethane was additionally supplied at intervals of 2 hours. The polymerization was carried out for 6 hours. A terpolymer of 3.18 kg. was obtained as small granules.

Furthermore, the same procedure was repeated except that the ratio of monomer was varied. Thus obtained elastomers were cured in the same manner as in Examples 1 to 6, and then the physical properties were measured. The results are shown in Table 2.

TABLE 2

| Example No. | Ratio of monomers in initial charging TFE : VdF : HFP (by molar ratio) | Ratio of monomers in continuous charging TFE : VdF : HFP (by molar ratio) | Polymerization temperature, °C. | Yield of polymer, g. | Intrinsic viscosity | Compression set, percent |
|---|---|---|---|---|---|---|
| 15 | 5.8 : 36.5 : 57.7 | 18 : 57 : 25 | 30 | 3,180 | 2.18 | 28.0 |
| 16 | 4.5 : 44.9 : 50.6 | 12 : 68 : 20 | 30 | 3,155 | 1.95 | 29.3 |

As clear from Table 2, regardless of high [η], minimum viscosity was the same as that of the elastomer obtained by the known emulsion polymerization at high temperature. Modulus at 100% elongation also showed the same tendency as in case of the minimum viscosity and the compression set was below 30.

EXAMPLE 17

The procedure in Examples 15 to 16 were repeated except that diisopropyl peroxydicarbonate as a polymerization initiator and the polymerization temperature of 40° C. were employed and that the polymerization initiator was supplied only once at the initiation of polymerization.

The test results of physical properties of the thus obtained fluoroelastomer are shown in Table 3.

TABLE 3

| Ex. No. | Ratio of monomers in initial charging | | | Ratio of monomer in continuous charging | | | Polymerization temperature, °C. | Yield of polymer, g. | Intrinsic viscosity |
|---|---|---|---|---|---|---|---|---|---|
| | TFE (by molar ratio) | : VdF | : HFP | TFE (by molar ratio) | : VdF | : HFP | | | |
| 17 | 4.5 | : 44.9 | : 50.6 | 12 | : 68 | : 20 | 40 | 3,000 | 1.15 |

| | Properties of cured rubber | | | | | Properties after air-aging | | |
|---|---|---|---|---|---|---|---|---|
| Ex. No. | Modulus at 100% kg./cm.$^2$ | Tensile strength, kg./cm.$^2$ | Elongation, percent | Hardness | Compression set, percent | Tensile strenght, kg./cm.$^2$ | Elongation, percent | Hardness |
| 17 | 41 | 155 | 240 | 73 | 26.6 | 73 | 140 | 88 |

As clear from Table 3, especially the compression set was as small as 26% in comparison with the elastomer obtained by the known emulsion polymerization at high temperature.

What we claim is:

1. A process for preparing fluoroelastomer by aqueous suspension polymerization which comprises
polymerizing tetrafluoroethylene, vinylidene fluoride and hexafluoropropene
in liquid droplets of halogenated hydrocarbon dispersed in water
in the presence of an oil-soluble radical polymerization initiator
at a temperature of 1° C. to 45° C.
under a pressure of 1 to 30 kg./cm.$^2$ G to give fluoroelastomer whose composition is within the area formed by the following four molar ratios of tetrafluoroethylene:vinylidene fluoride:hexafluoropropene being 5:85.7:9.3, 5:59.7:35.3, 30:28:42 and 30:54:16; said halogenated hydrocarbon being at least one selected from the group consisting of perhaloalkane and hexafluoropropene; and the amount of said liquid droplets being from 10% to 100% by weight to water present in the ratio of 50% to 100% by weight to the fluoroelastomer prepared.

2. The process according to claim 1, wherein said amount of liquid droplets is from 20% to 67% by weight to water present.

3. The process according to claim 1, wherein said halogenated hydrocarbon is a perfluorochloroalkane.

4. The process according to claim 3, wherein the said perfluorochloroalkane is a member selected from the group consisting of 1,1,2-trichloro-1,2,2-trifluoroethane, 1,2-dichloro - 1,1,2,2 - tetrafluoroethane, trichlorofluoromethane and dichlorodifluoromethane.

5. The process according to claim 3 wherein the said per fluorochloroalkane is 1,1,2-trichloro-1,2,2-trifluoroethane.

6. The process according to claim 1, wherein the said oil-soluble polymerization initiator is a member selected from the group consisting of di(perfluoroacyl)peroxide, di(fluorochloroacyl) peroxide, dialkyl peroxydicarbonate, diacyl peroxide, peroxyester and acetyl cyclohexylsulfonyl peroxide.

7. The process according to claim 1, wherein the said oil-soluble polymerization initiator is a member selected from the group consisting of di(perfluoroacyl) peroxide, di(fluorochloroacyl) peroxide and dialkyl peroxydicarbonate.

8. The process according to claim 7, wherein the said di(fluorochloroacyl) peroxide is di(3,5,6-trichloro-2,2,3,4,4,5,6,6-octafluorohexanoyl) peroxide.

9. The process according to claim 7, wherein the said dialkyl peroxydicarbonate is diisopropyl peroxy dicarbonate.

10. The process according to claim 1, wherein the said composition is in the rectangular area formed by the following four ratios of tetrafluroroethylene:vinylidene fluoride:hexafluoropropene being 10:79.3:10.7, 10:53.3:36.7, 25:34.3:40.7 and 25:60.3:14.7, by molar ratio.

11. The process according to claim 1, wherein the said temperature is 10 to 40° C.

References Cited
UNITED STATES PATENTS 2,968,649    1/1961    Pailthorp et al. _____ 260—80.5
3,451,978    6/1969    Chalmers et al. _____ 260—78.5

STANFORD M. LEVIN, Primary Examiner

U.S. Cl. X.R.
260—32 OR; 41A, 41C